(12) United States Patent
Yagi et al.

(10) Patent No.: US 8,148,458 B2
(45) Date of Patent: Apr. 3, 2012

(54) RUBBER COMPOSITION FOR TREAD AND PNEUMATIC TIRE USING THE SAME

(75) Inventors: Noriko Yagi, Kobe (JP); Kiyoshige Muraoka, Kobe (JP)

(73) Assignee: Sumitomo Rubber Industries, Ltd., Kobe-Shi (JP)

( * ) Notice: Subject to any disclaimer, the term of this patent is extended or adjusted under 35 U.S.C. 154(b) by 0 days.

(21) Appl. No.: 12/501,968

(22) Filed: Jul. 13, 2009

(65) Prior Publication Data

US 2009/0275675 A1 Nov. 5, 2009

Related U.S. Application Data

(62) Division of application No. 10/842,515, filed on May 11, 2004, now abandoned.

(30) Foreign Application Priority Data

| Jun. 3, 2003 | (JP) | 2003-158448 |
| Jun. 3, 2003 | (JP) | 2003-158449 |
| Jul. 25, 2003 | (JP) | 2003-201852 |

(51) Int. Cl.
*B60C 1/00* (2006.01)
*C08L 37/00* (2006.01)

(52) U.S. Cl. ........ 524/572; 524/492; 524/493; 525/208; 525/327.3

(58) Field of Classification Search .......... 524/492, 524/493, 495, 496, 572, 517; 525/208, 327.3
See application file for complete search history.

(56) References Cited

U.S. PATENT DOCUMENTS

| 3,352,823 A | 11/1967 | Haworth et al. |
| 4,992,513 A * | 2/1991 | Bauer et al. ........ 525/184 |
| 5,157,079 A * | 10/1992 | Duck et al. ........ 525/113 |
| 5,489,628 A | 2/1996 | Sandstrom |
| 5,569,690 A * | 10/1996 | Terakawa et al. ........ 524/251 |
| 5,736,593 A | 4/1998 | Sandstrom |
| 6,482,884 B1 | 11/2002 | Schaal et al. |
| 6,492,454 B1 | 12/2002 | Ozawa et al. |
| 6,845,797 B2 | 1/2005 | Lin et al. |
| 2003/0092801 A1 | 5/2003 | Agostini et al. |

FOREIGN PATENT DOCUMENTS

| EP | 0 644 235 A1 | 3/1995 |
| EP | 0 678 551 A1 | 10/1995 |
| EP | 0 933 391 A1 | 8/1999 |
| EP | 1 312 639 A1 | 5/2003 |
| GB | 2113692 A * | 8/1983 |
| JP | A-06-329702 | 11/1994 |
| JP | A-06-329838 | 11/1994 |
| JP | 7-090123 A | 4/1995 |
| JP | 7-149955 A | 6/1995 |
| JP | 11-269307 A | 10/1999 |
| JP | 2000-109612 A | 4/2000 |
| JP | 2004-359773 | 12/2004 |
| JP | 2004-359774 | 12/2004 |

OTHER PUBLICATIONS

Perera, M.C.S., "Reaction of Aromatic Amines with Epoxidized Natural Rubber Latex," Journal of Applied Polymer Science, vol. 39, 749-758 (1990).*

* cited by examiner

*Primary Examiner* — Vickey Nerangis
(74) *Attorney, Agent, or Firm* — Birch, Stewart, Kolasch & Birch, LLP

(57) ABSTRACT

A method of compounding a modified, epoxidized natural rubber for use as a tire tread which includes the steps of modifying an epoxidized natural rubber containing a ring-opened epoxy group, compounding the modified, epoxidized natural rubber with another rubber, to form a rubber compound, together with silica and/or carbon black to form a rubber composition, and forming the rubber composition into a tire tread.

13 Claims, No Drawings

RUBBER COMPOSITION FOR TREAD AND PNEUMATIC TIRE USING THE SAME

This application is a Divisional of application Ser. No. 10/842,515, filed on May 11, 2004, now abandoned the entire contents of which are hereby incorporated by reference and for which priority is claimed under 35 U.S.C. §120.

BACKGROUND OF THE INVENTION

The present invention relates to a rubber composition for a tread and a pneumatic tire, particularly a rubber composition containing modified epoxidized natural rubber.

In recent years, concern is rising regarding increase in oil prices and exhaustion of oil due to problems of supply. Also, from the viewpoint of environmental problems such as tightening regulations regarding resource conservation and prevention of carbon dioxide exhaust, natural resources are being reconsidered. The tire industry is not an exception and as an alternative material of synthetic rubber, natural rubber is attracting attention again. Natural rubber has high mechanical strength and excellent abrasion resistance and therefore is frequently used in large tires such as truck/bus tires. However, because natural rubber only has methyl groups with small molecular weight in the side chains and has a low glass transition temperature (Tg) of −60° C., there is the problem that gripping performance is poor.

In order to solve such problems, the method of using epoxidized natural rubber is suggested (see JP-A-6-220254, JP-A-7-90123, JP-A-7-149955 and JP-A-2001-233995). Epoxidized natural rubber is natural rubber wherein the unsaturated double bonds are epoxidized and molecular aggregating ability of the rubber increases due to the epoxy groups, which are polar groups. Consequently, epoxidized natural rubber has higher glass transition temperature (Tg) than natural rubber and is excellent in mechanical strength, abrasion resistance and gas permeation resistance. Particularly, in rubber containing silica, the silanol groups of the silica surface and the epoxy groups react and as a result, mechanical strength and abrasion resistance equivalent to those of rubber containing carbon black can be obtained. However, although epoxidized natural rubber has large hysteresis loss and is excellent in wet grip performance, there is the problem that rolling resistance is insufficient.

The present invention aims to provide a rubber composition for a tread, in which both improvement in wet grip performance and decrease in heat generating properties can be achieved while maintaining the excellent properties of epoxidized natural rubber such as mechanical properties and abrasion resistance, and a pneumatic tire using the same.

SUMMARY OF THE INVENTION

That is, the present invention relates to a rubber composition for a tread comprising 5 to 150 parts by weight of silica having nitrogen-adsorbing specific surface area of 100 to 300 m²/g and/or carbon black having nitrogen-adsorbing specific surface area of 70 to 300 m²/g, based on 100 parts of a rubber component containing 5 to 100% by weight of a modified epoxidized natural rubber obtained by reacting epoxidized natural rubber with a compound selected from the group consisting of a Lewis acid, an amine compound, a thiol compound, an amide compound and an imidazole compound to conduct ring opening of an epoxy group.

The rubber composition preferably contains at most 20% by weight of a silane coupling agent based on the silica.

The silane coupling agent is preferably represented by the following formula (1)

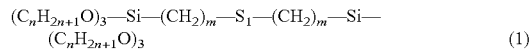

(1)

(in formula (1), n is an integer of 1 to 3, m is an integer of 1 to 4, 1 is the number of sulfur atoms in the polysulfide part and the average value of 1 is 2.1 to 4.5).

The epoxidization degree of the epoxidized natural rubber is preferably 5 to 80% by mol.

The Lewis acid is preferably selected from the group consisting of alcohol, a phenol compound, a carboxylic acid and an acid anhydride.

The modification degree of the modified epoxidized natural rubber is preferably 5 to 60%.

The protein content of the modified epoxidized natural rubber is preferably at most 0.1% by weight converted to nitrogen content.

The present invention also relates to a pneumatic tire comprising the rubber composition for a tread.

DETAILED DESCRIPTION

The present invention is described in detail below.

The rubber composition for a tread of the present invention comprises a rubber component and silica and/or carbon black.

The rubber component contains modified epoxidized natural rubber obtained by reacting epoxidized natural rubber with a compound such as Lewis acid to conduct ring opening of the epoxy groups.

As the epoxidized natural rubber, commercially available epoxidized natural rubber can be used or natural rubber can be epoxidized and then used. The method for epoxidizing natural rubber is not particularly limited and epoxidization can be conducted using methods such as the chlorohydrin method, the direct oxidization method, the hydrogen peroxide method, the alkyl hydroperoxide method and the peracid method. An example is the method of reacting natural rubber with organic peracid such as peracetic acid or performic acid.

The epoxidization degree of the epoxidized natural rubber is preferably at least 5% by mol. When the epoxidization degree is lower than 5% by mol, the effects of modifying tend to be small. Also, the epoxidization degree is preferably at most 80% by mol, more preferably at most 60% by mol. When the epoxidization degree is higher than 80% by mol, the polymer tends to gelate.

The modified epoxidized natural rubber used in the present invention is obtained by conducting ring opening of epoxy groups in the epoxidized natural rubber using a compound having reactivity with epoxy groups.

The method for modifying epoxidized natural rubber is not particularly limited and can be conducted in any of the states of a latex, a solution of natural rubber or solid rubber. When modifying in a latex, the latex of natural rubber that is used is not particularly limited and either of commercially available ammonia treated latex or field latex may be used. When modifying in a solution, the organic solvent that is used is not limited as long as the solvent itself does not react with the epoxidized natural rubber and the Lewis acid. For example, aromatic hydrocarbon such as benzene, chlorobenzene, toluene and xylene; aliphatic hydrocarbon such as n-heptane, n-hexane, n-pentane and n-octane; and alicyclic hydrocarbon such as cyclohexane, methylcyclohexane, tetralin and decalin can suitably be used. Also, methylene chloride can be used. When modifying as solid rubber, the rubber can be modified by directly kneading with a roll or extrusion kneader. From the viewpoints of cost and ease in handling, modification of epoxidized natural rubber is preferably conducted in latex.

Examples of the compound having reactivity with epoxy groups are Lewis acids, amine compounds, thiol compounds, amide compounds and imidazole compounds. Examples of Lewis acids are alcohol, phenol compounds, carboxylic acids and acid anhydrides.

Examples of the alcohol are methanol, ethanol, 1-propanol, 2-propanol, 1-butanol, 2-butanol, isobutyl alcohol, t-butyl alcohol, ethylene glycol, propylene glycol, trimethylene glycol, triethylene glycol, glycerin, phenylmethanol and 2-phenylethanol.

Examples of the phenol compound are phenol, o-cresol, p-cresol, 1-naphthol, catechol, resorcinol and hydroquinone.

Examples of the carboxylic acid are formic acid, acetic acid, propionic acid, n-butyric acid, isobutyric acid, valeric acid, caproic acid, glycolic acid, lactic acid, hydroacrylic acid, 3-hydroxybutyric acid, glyceric acid, gluconic acid, fluoroacetic acid, chloroacetic acid, chloropropionic acid, chlorobutyric acid, trichlorobutyric acid, trichloroacetic acid, aldehydic acid, pyruvic acid, acetoacetic acid, levulinic acid, benzoic acid, p-toluic acid, m-chlorobenzoic acid, salicylic acid, m-hydroxybenzoic acid, phenylacetic acid, malonic acid, succinic acid, tartaric acid, malic acid, phthalic acid and citric acid.

Examples of the acid anhydride are propionic anhydride, n-butyric anhydride, isobutyric anhydride, n-valeric anhydride, hexane anhydride, benzoic anhydride, glutaric anhydride, 1,2-cyclohexanedicarboxylic anhydride, phthalic anhydride, 1,8-naphthalic anhydride, trimellitic anhydride and pyromellitic dianhydride.

Examples of the amine compound are methyl amine, dimethyl amine, trimethyl amine, ethyl amine, diethyl amine, triethyl amine, n-propylamine, di-n-propylamine, tri-n-propylamine, isopropylamine, diisopropylamine, triisopropylamine, n-butylamine, di-n-butylamine, tri-n-butylamine, isobutylamine, diisobutylamine, triisobutylamine, n-pentylamine, di-n-pentylamine, tri-n-pentylamine, n-hexylamine, di-n-hexylamine, tri-n-hexylamine, cyclohexylamine, dicyclohexylamine, n-methylcyclohexylamine, n-heptylamine, di-n-heptylamine, tri-n-heptylamine, cycloheptylamine, n-octylamine, di-n-octylamine, tri-n-octylamine, cyclooctylamine, N,N-dimethyloctylamine, n-decylamine, di-n-decylamine, tri-n-decylamine, laurylamine, myristylamine, stearylamine, benzylamine, phenylamine, diphenylamine, triphenylamine, N-methylbenzylamine, N,N-dimethylbenzylamine, 2-naphthylamine, 4-quinolylamine, ethylenediamine, trimethylenediamine, triethylenediamine, diethylenetriamine, 1,4-naphthelenediamine, aniline, o-toluidine, 2,3-xylidine, o-anisidine, o-phenetidine, N,N-dibenzylethylenediamine, phenetylamine, p-phenylenediamine, 2,3-diaminonaphthalene, 3-methoxypropylamine, N-methylaniline, N,N-dimethylaniline, N,N-diethylaniline, N-ethyl-N-methylbutylamine, diethylbutylamine, N-methyldiethanolamine, triethanolamine, n-propanolamine, di-n-propanolamine, tri-n-propanolamine, diisopropanolamine, triisopropanolamine, tributanolamine, dipropylenetriamine, N-n-butyldiethanolamine, 2-aminopentane, hexamethylenediamine, dodecamethylenediamine, pyridine, 3-aminopropyltriethoxysilane, 3-aminopropyltrimethoxysilane, 3-(2-amino ethyl) aminopropyltriethoxysilane and 3-(2-aminoethyl)aminopropyltrimethoxysilane. From the viewpoint that reactivity with epoxy groups is excellent, tertiary amines are particularly preferable as the amine compound.

Examples of the thiol compound are ethyl mercaptan, 1-propanethiol, n-butyl mercaptan, 1-hexanethiol, 1-dodecanethiol, 1-octanethiol, benzenethiol, 1,2-ethanedithiol, 1,3-propanedithiol, 1,4-butanethiol, 1,2-benzenethiol, 1,4-benzenethiol, 2-aminoethanethiol, 2-aminobenzenethiol, 4-aminobenzenethiol, mercaptoacetic acid and o-mercaptobenzoic acid.

Examples of the amide compound are formamide, acetamide, propioneamide, n-butylamide, valeramide, hexaneamide, stearamide, benzamide, succinamide, oxamide, N-hydroxyacetamide, N-(2-hydroxy)acetamide, N-methylbenzamide, o-hydroxybenzamide, p-hydroxybenzamide, o-aminobenzamide, p-aminobenzamide, o-acetamidophenol, p-acetamidophenol, sulphenylamide, o-acetamidobenzoic acid, benzanilide, diethyl acetamidomalonate, N-methylformamide, N,N-dimethylformamide, N,N-diethylformamide, N-methylacetamide, N,N-dimethylacetamide, nicotineamide, thioacetamide, o-toluenesulfonamide and p-toluenesulfonamide.

Examples of the imidazole compound are imidazole, 1-methylimidazole, 2-methylimidazole, N-acetylimidazole, 2-mercapto-1-methylimidazole, benzoimidazole, 2-mercaptobenzoimidazole and 2-phenylimidazole.

The amount of the compound having reactivity with epoxy groups is preferably at least 5% by mol, more preferably at least 10% by mol, based on the epoxidized natural rubber. When the amount of the compound is less than 5% by mol, sufficient gripping performance may not be obtained. Also, the amount of the compound is preferably at most 60% by mol, more preferably at most 55% by mol. When the amount of the compound is more than 60% by mol, tensile strength and abrasion resistance tend to decrease.

The reaction temperature is preferably 40 to 160° C. When the reaction temperature is lower than 40° C., the reaction rate is slow and reactivity tends to decrease. When the temperature is higher than 160° C., the polymer tends to gelate during reaction.

When modification reaction of epoxidized natural rubber is conducted in a latex or a solution, the reaction time is preferably at least 0.5 hour, more preferably at least 1 hour. When the reaction time is less than 0.5 hour, the modification reaction does not advance sufficiently and the desired modified epoxidized natural rubber may be difficult to obtain. Also, the reaction time is preferably within 10 hours, more preferably within 8 hours. When the reaction time is more than 10 hours, gelation of the polymer and side reactions tend to occur.

The modification degree of the epoxidized natural rubber obtained in this way is preferably at least 5%, more preferably at least 10%. When the modification degree is lower than 5%, sufficient gripping performance and fuel efficiency may not be obtained. Also, the modification degree is preferably at most 60%, more preferably at most 55%. When the modification degree is higher than 60%, abrasion resistance and propagation strength tend to decrease.

Usually, natural rubber contains approximately 5 to 10% of non-rubber components such as protein. These non-rubber components, particularly protein, inhibit modification of natural rubber.

Therefore, the modified natural rubber that is used in the present invention is preferably deproteinized natural rubber, wherein the protein in the natural rubber is removed to at most 0.1% by weight converted to nitrogen content. By using natural rubber that is deproteinized to a nitrogen content of at most 0.1% by weight, natural rubber can be efficiently modified and high modifying effects can be achieved. Particularly, the amount of protein in the modified natural rubber is preferably at most 0.05% by weight, more preferably at most 0.03% by weight, further preferably at most 0.02% by weight, converted to nitrogen content. Natural rubber wherein the nitrogen content is at most 0.03% by weight is considered to be almost completely free of protein.

Deproteinized natural rubber can be prepared by the method of decomposing protein by adding a protein-decomposing enzyme or bacteria to the latex, the method of repeatedly washing with a surfactant such as soap or a combination of these methods.

The protein-decomposing enzyme is not particularly limited and can be an enzyme derived from bacteria, filamentous bacteria or yeast. Of these, a protein-decomposing enzyme derived from bacteria is preferably used.

As the surfactant, an anionic surfactant and/or a nonionic surfactant is suitably used. Examples of the anionic surfactant are carboxylic acid types, sulfonic acid types, sulfuric ester types and phosphoric ester types. As the nonionic surfactant, polyoxyalkylene ether types, polyoxyalkylene ester types, polyol fatty acid ester types, sugar fatty acid ester types and alkyl polyglycoxide can be suitably be used.

To decompose the protein in the latex of natural rubber with a protein-decomposing enzyme, the protein-decomposing enzyme is preferably added to a field latex or an ammonia treated latex in a proportion of approximately 0.001 to 10% by weight. The time of treatment by the enzyme is not particularly limited, but treatment is preferably conducted for approximately a few minutes to one week. The latex can be stirred or can be left still. Also, the temperature may be adjusted when necessary and the treatment temperature is preferably at least 5° C., more preferably at least 20° C. When the treatment temperature is lower than 5° C., the enzyme reaction tends to have difficulty progressing. Also, the treatment temperature is preferably at most 90° C., more preferably at most 60° C. When the treatment temperature is higher than 90° C., the enzyme tends to deactivate.

Washing of latex particles with a surfactant can be conducted to the latex before enzyme treatment or latex after enzyme treatment. The amount of the surfactant is preferably at least 0.001% by weight based on the latex. Also, the amount of the surfactant is at most 15% by weight, more preferably at most 10% by weight. Examples of the washing method are the method of adding the surfactant to the latex before or after enzyme treatment and then centrifuging and the method of separating by coagulating the latex particles. When washing the latex by centrifuging, centrifugation can be conducted once or several times. Also, when washing natural rubber, synthetic rubber or synthetic latex can be used together.

The modified epoxidized natural rubber used in the present invention is contained in the rubber component in an amount of at least 5% by weight, preferably at least 8% by weight, more preferably at least 10% by weight. When the amount of modified epoxidized natural rubber is less than 5% by weight, the effects of adding modified epoxidized natural rubber are small. Also, only modified natural rubber can be contained in the rubber component.

As a rubber component other than modified epoxidized natural rubber, natural rubber (NR) and/or diene synthetic rubber can be used. Examples of the diene synthetic rubber used in the present invention are styrene-butadiene rubber (SBR), polybutadiene rubber (BR), polyisoprene rubber (IR), ethylene-propylene-diene rubber (EPDM), chloroprene rubber (CR), acrylonitrile-butadiene rubber (NBR) and butyl rubber (IIR). These rubbers may be used alone or two or more kinds may be used together.

The silica used in the present invention can be silica prepared by a wet method or a dry method and is not particularly limited. The silica has nitrogen-adsorbing specific surface area ($N_2SA$) of at least 100 m$^2$/g, preferably at least 130 m$^2$/g. When $N_2SA$ of the silica is less than 100 m$^2$/g, the reinforcing effects are small. Also, the $N_2SA$ of the silica is preferably at most 300 m$^2$/g, more preferably at most 280 m$^2$/g. When $N_2SA$ of the silica is more than 300 m$^2$/g, dispersability decreases and heat generation of the rubber composition increases.

The amount of silica is at least 5 parts by weight, preferably at least 10 parts by weight, more preferably at least 15 parts by weight, based on 100 parts by weight of the rubber component. When the amount of silica is less than 5 parts by weight, heat generation is not sufficiently decreased and excellent wet grip performance cannot be obtained. Also, the amount of silica is at most 150 parts by weight, preferably at most 120 parts by weight, more preferably at most 100 parts by weight. When the amount of silica is more than 150 parts by weight, processability and workability decrease.

The nitrogen-adsorbing specific surface area ($N_2SA$) of the carbon black used in the present invention is at least 70 m$^2$/g, preferably at least 80 m$^2$/g. When $N_2SA$ of the carbon black is less than 70 m$^2$/g, the reinforcing effects are small. Also, $N_2SA$ of the carbon black is at most 300 m$^2$/g, preferably at most 280 m$^2$/g. When $N_2SA$ of the carbon black is more than 300 m$^2$/g, dispersability decreases and heat generation of the rubber composition increases.

The amount of carbon black is at least 5 parts by weight, preferably at least 10 parts by weight, more preferably at least 15 parts by weight, based on 100 parts by weight of the rubber component. When the amount of carbon black is less than 5 parts by weight, sufficient reinforcing effects cannot be obtained. Also, the amount of carbon black is at most 150 parts by weight, preferably at most 120 parts by weight, more preferably at most 100 parts by weight. When the amount of carbon black is more than 150 parts by weight, processability and workability decrease.

Furthermore, the rubber composition for a tread of the present invention can contain a silane coupling agent. As the silane coupling agent, any silane coupling agent that is conventionally used together with a silica filler can be used. Examples are sulfide-type, mercapto-type, vinyl-type, amino-type, glycidoxy-type, nitro-type and chloro-type silane coupling agents.

Examples of sulfide-type silane coupling agents are
bis(3-triethoxysilylpropyl)tetrasulfide,
bis(2-triethoxysilylethyl)tetrasulfide,
bis(4-triethoxysilylbutyl)tetrasulfide,
bis(3-trimethoxysilylpropyl)tetrasulfide,
bis(2-trimethoxysilylethyl)tetrasulfide,
bis(4-trimethoxysilylbutyl)tetrasulfide,
bis(3-triethoxysilylpropyl)trisulfide, bis(2-triethoxysilylethyl)trisulfide,
bis(4-triethoxysilylbutyl)trisulfide, bis(3-trimethoxysilylpropyl)trisulfide,
bis(2-trimethoxysilylethyl)trisulfide, bis(4-trimethoxysilylbutyl)trisulfide,
bis(3-triethoxysilylpropyl)disulfide, bis(2-triethoxysilylethyl)disulfide,
bis(4-triethoxysilylbutyl)disulfide, bis(3-trimethoxysilylpropyl)disulfide,
bis(2-trimethoxysilylethyl)disulfide, bis(4-trimethoxysilylbutyl)disulfide,
3-trimethoxysilylpropyl-N,N-dimethylthiocarbamoyltetrasulfide,
3-triethoxysilylpropyl-N,N-dimethylthiocarbamoyltetrasulfide,
2-triethoxysilylethyl-N,N-dimethylthiocarbamoyltetrasulfide,
2-trimethoxysilylethyl-N,N-dimethylthiocarbamoyltetrasulfide, 3-trimethoxysilylpropylbenzothiazolyltetrasulfide,
3-triethoxysilylpropylbenzothiazoletetrasulfide,
3-triethoxysilylpropylmethacrylatemonosulfide and
3-trimethoxysilylpropylmethacrylatemonosulfide.

Examples of mercapto-type silane coupling agents are 3-mercaptopropyltrimethoxysilane, 3-mercaptopropyltriethoxysilane, 2-mercaptoethyltrimethoxysilane and 2-mercaptoethyltriethoxysilane.

Examples of vinyl-type silane coupling agents are vinyl triethoxysilane and vinyl trimethoxysilane.

Examples of amino-type silane coupling agents are 3-aminopropyltriethoxysilane, 3-aminopropyltrimethoxysilane, 3-(2-amino ethyl) aminopropyltriethoxysilane and 3-(2-aminoethyl) aminopropyltrimethoxysilane.

Examples of glycidoxy-type silane coupling agents are γ-glycidoxypropyltriethoxysilane, γ-glycidoxypropyltrimethoxysilane, γ-glycidoxypropylmethyldiethoxysilane and γ-glycidoxypropylmethyldimethoxysilane.

Examples of nitro-type silane coupling agents are 3-nitropropyltrimethoxysilane and 3-nitropropyltriethoxysilane.

Examples of chloro-type silane coupling agents are 3-chloropropyltrimethoxysilane, 3-chloropropyltriethoxysilane, 2-chloroethyltrimethoxysilane and 2-chloroethyltriethoxysilane.

Of these, in view of achieving both the effects of adding the coupling agent and low cost, bis(3-triethoxysilylpropyl)tetrasulfide and 3-mercaptopropyltrimethoxysilane are suitably used. These coupling agents may be used alone or two or more kinds may be used together.

Furthermore, the silane coupling agent is preferably a silane coupling agent represented by the following formula (1).

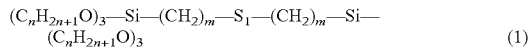

$$(C_nH_{2n+1}O)_3—Si—(CH_2)_m—S_l—(CH_2)_m—Si—(C_nH_{2n+1}O)_3 \quad (1)$$

In formula (1), n is an integer of 1 to 3, m is an integer of 1 to 4 and l is the number of sulfur atoms in the polysulfide part. The average value of l is 2.1 to 4.5, preferably 2.1 to 3.5. When the average value of l is less than 2.1, reactivity of the silane coupling agent and the rubber component becomes poor and when the average value is more than 4.5, gelation is accelerated when processing, thus being unfavorable.

Examples of such coupling agents are
bis(3-triethoxysilylpropyl)polysulfide,
bis(2-triethoxysilylethyl)polysulfide,
bis(3-trimethoxysilylpropyl)polysulfide,
bis(4-triethoxysilylbutyl)polysulfide and
bis(4-trimethoxysilylbutyl)polysulfide. Of these silane coupling agents, in view of achieving both the effects of adding the coupling agent and low cost, bis(3-triethoxysilylpropyl)disulfide is suitably used. These coupling agents may be used alone or two or more kinds may be used together.

The amount of the silane coupling agent is preferably at most 20% by weight, more preferably at most 15% by weight, based on the amount of silica. When the amount of the silane coupling agent is more than 20% by weight, the coupling effect is not obtained although cost is high and reinforcing properties and abrasion resistance tend to decrease. Also, in view of the dispersion effect and the coupling effect, the amount of the silane coupling agent is preferably at least 0.5% by weight, particularly at least 1% by weight, and at most 15% by weight.

Besides the rubber component, silica, carbon black and silane coupling agent, the rubber composition for a tread of the present invention can contain compounding agents that are usually used in the rubber industry when necessary, such as a softening agent, an antioxidant, a vulcanizing agent, a vulcanization accelerator and a vulcanization accelerating aid.

The tire of the present invention is prepared by the usual method using the rubber composition of the present invention. That is, the rubber composition for a tread of the present invention to which the above additives are added when necessary is extrusion molded into the shape of a tire tread before vulcanization and then formed into a tire by the usual method on a tire molding machine to prepare an unvulcanized tire. The unvulcanized tire is heated and pressurized in a vulcanizer to prepare a tire.

Hereinafter, the present invention is explained in detail by means of Examples, but the present invention is not limited thereto.

<Preparation of Modified Natural Rubber>
Polymer 1 (Deproteinized Natural Rubber)

A latex of high ammonia-type natural rubber (solid content 62.0%) available from Guthrie Bhd. (Malaysia) was used.

The latex of natural rubber was diluted with a 0.12% aqueous solution of sodium naphthenate so that the solid rubber content became 10%. The pH thereof was adjusted to 9.2 using sodium dihydrogen phosphate and then, 2 M Alcalase was added in a proportion of 0.87 g based on 10 g of the rubber component. After adjusting the pH to 9.2 again, the latex was maintained at 37° C. for 24 hours.

To the enzyme-treated latex, a 1% aqueous solution of Emulgen 810 (available from Kao Corporation), which is a nonionic surfactant, was added to adjust the rubber concentration to 8%. Then, centrifugation was conducted for 30 minutes at 11,000 rpm. The produced creamy fraction was dispersed in a 1% aqueous solution of Emulgen 810 and after the rubber concentration was adjusted to approximately 8%, centrifugation was conducted again. After this process was repeated once more, the obtained creamy fraction was dispersed in distilled water to prepare a latex of deproteinized rubber having solid rubber content of 60% (Polymer 1).

Polymer 2 (Epoxidization of high ammonia-type natural rubber)

A 500 ml four-necked flask equipped with a stirring rod, a dropping funnel and a condenser was charged with 150 g of a latex of high ammonia-type natural rubber (Hytex, available from Nomura Trading Co., Ltd.) (solid content 60%). The latex was diluted with 150 ml of distilled water so that the solid content became 30% and the temperature thereof was adjusted to 20° C. While stirring, 0.9 g of a nonionic emulsifier (Emulgen 106, available from Kao Corporation) was added thereto. Then, while adjusting the pH of the latex so as to be within the range of pH 5 to 6 using 2.8% ammonia water, 265 g of peracetic acid having concentration of 2.5 mol/L was slowly added. After adding, reaction was conducted for 5 hours at room temperature to obtain latex of epoxidized natural rubber (Polymer 2).

Polymer 3 (Epoxidization of deproteinized natural rubber)

A latex of epoxidized natural rubber (Polymer 3) was obtained in the same manner as Polymer 2, except that the deproteinized natural rubber of Polymer 1 was used instead of high ammonia-type natural rubber. Polymer 4 (Modification of epoxidized natural rubber)

After adjusting the pH of epoxidized natural rubber (Polymer 2) to pH 10 using ammonia water, 44.6 g of phenol was added based on 90 g of the rubber component and reaction was conducted for 5 hours at 65° C. After the reaction, methanol was added to coagulate the only the rubber content. The rubber content was washed with water several times and then dried to obtain Polymer 4.

Polymer 5 (Modification of epoxidized natural rubber)

Polymer 5 was obtained in the same manner as Polymer 4, except that the epoxidized natural rubber of Polymer 3 was used.

<Preparation of Samples for Analysis>

The respectively obtained Polymers 1 to 5 and commercially available latex of high ammonia-type natural rubber (Hytex, available from Nomura Trading Co., Ltd.) were flow casted onto a glass plate and after drying at room temperature, were dried in vacuum. After drying, Polymers 2 to 5 were extracted with acetone to remove impurities such as homopolymers.

<Analysis of Natural Rubber>

(Nitrogen Content)

The nitrogen content was measured by the Kjeldahl testing method.

(IR)

The infrared absorption spectrum was measured using a Fourier transform infrared spectrometer made by PerkinElmer, Inc.

($^1$H-NMR)

$^1$H-NMR was measured using a device made by JEOL Ltd. Chloroform-d1 was used as the measurement solvent.

(Epoxidization Degree(A))

The epoxidization degree was calculated by the following equation, from the ratio of area intensity (B) of methine protons derived from natural rubber at 5.1 ppm and area intensity (C) of protons derived from epoxy groups near 2.7 ppm.

$$\text{Epoxidization degree } (A)(\%) = \frac{\text{Area intensity } (C)}{\text{Area intensity } (B) + \text{Area intensity } (C)} \times 100$$

(Ring Opening Degree (D))

The ring opening degree was calculated by the following equation, from area intensity (E) of methine protons derived from phenyl groups near 7.2 ppm, area intensity (F) of methine protons derived from natural rubber near 5.1 ppm and area intensity (G) of protons derived from epoxy groups near 2.7 ppm.

$$\text{Ring opening degree } (D)(\%) = \frac{\text{Area intensity } (E)/5}{\text{Area intensity } (E)/5 + \text{Area intensity } (F) + \text{Area intensity } (G)} \times 100$$

(Modification Degree)

The modification degree of epoxidized natural rubber was found from the following equation.

$$\text{Modification degree } (\%) = \frac{\text{Ring opening degree } (\%) \times \frac{\text{Mol concentration of phenol}}{\text{Mol concentration of natural rubber}}}{} \times 100$$

The analysis results of HANR (latex of high ammonia-type natural rubber Hytex, available from Nomura Trading Co., Ltd.) and Polymers 1 to 5 are shown in Table 1.

TABLE 1

| | Nitrogen content (%) | Epoxidization degree (%) | Ring opening degree (%) | Modification degree (%) |
|---|---|---|---|---|
| HANR | 0.40 | — | — | — |
| Polymer 1 | 0.025 | — | — | — |
| Polymer 2 | 0.39 | 43.8 | — | — |
| Polymer 3 | 0.024 | 46.7 | — | — |
| Polymer 4 | 0.39 | 39.4 | 77.9 | 42.4 |
| Polymer 5 | 0.024 | 43.9 | 89.5 | 48.7 |

EXAMPLES 1 to 10 and COMPARATIVE EXAMPLES 1 to 25

<Compounding Agents>

Natural Rubber (NR): RSS #3
SBR: SBR1502 (amount of styrene units: 23.5% by weight) available from JSR Corporation
HANR: Latex of high ammonia-type natural rubber Hytex available from Nomura Trading Co., Ltd.
Silica: Ultrasil VN3 available from Degussa Co. ($N_2SA$: 210 m$^2$/g)
Carbon black: SHOWBLACK N220 available from Showa Cabot Co. Ltd. ($N_2SA$: E125 m$^2$/g)
Silane coupling agent 1: Si69 (bis(3-triethoxysilylpropyl)tetrasulfide) (average value of 1: 3.8) available from Degussa Co.
Silane coupling agent 2: Si266 (bis(3-triethoxysilylpropyl) disulfide) (average value of 1: 2.2) available from Degussa Co.
Antioxidant: NOCRAC 6C (N-(1,3-dimethylbutyl)-N'-phenyl-p-phenylenediamine) available from Ouchi Shinko Chemical Industrial Co., Ltd.
Stearic acid: Stearic acid available from NOF Corporation
Zinc oxide: Zinc oxide type 1 available from Mitsui Mining and Smelting Co., Ltd.
Sulfur: Powdery sulfur available from Tsurumi Chemicals Co., Ltd.
Vulcanization Accelerator TBBS: Nocceler NS (N-tert-butyl-2-benzothiazyl sufenamide) available from Ouchi Shinko Chemical Industrial Co., Ltd.
Vulcanization Accelerator DPG: Nocceler D (N,N'-diphenyl guanidine) available from Ouchi Shinko Chemical Industrial Co., Ltd.

<Preparation of Vulcanized Rubber Sample>

Formic acid or methanol was gradually added to the latex of natural rubber. After only the rubber component was coagulated, the rubber component was washed several times with distilled water and dried. Using the obtained natural rubber, the components were kneaded and mixed according to the composition formula shown in Tables 2 to 6 to obtain each sample rubber composition. These compositions were press vulcanized for 30 minutes at 150° C. to obtain vulcanized articles and with respect to the articles, each of the following tests of properties were conducted.

<Testing Method of Vulcanized Rubber Sample>

(Processability)

The Mooney viscosity was measured at 130° C. according to the method for measuring Mooney viscosity defined in JIS K6300. The Mooney viscosity ($ML_{1+4}$) of Comparative Example 1, 6, 11, 16 or 21 (standard composition) was assumed to be 100 and processability was represented as an index by the following equation. The larger the index is the lower the Mooney viscosity and the better the processability.

Mooney viscosity index=($ML_{1+4}$ of standard composition)/($ML_{1+4}$ of each composition)×100

(Rolling Resistance)

The tanδ of each composition was measured under conditions of temperature of 70° C., initial strain of 10% and dynamic strain of 2% using a viscoelasticity spectrometer VES (made by Iwamoto Corporation). The tanδ of Comparative Example 1, 6, 11, 16 or 21 (standard composition) was assumed to be 100 and rolling resistance was represented as an index by the following equation. The larger the index is the better the rolling resistance.

Rolling resistance index=(tanδ of standard composition)/(tanδ of each composition)×100

(Abrasion Test)

The amount of Lambourn abrasion was measured under conditions of temperature of 20° C., slip ratio of 20% and testing time of 5 minutes using a Lambourn abrasion tester and the volume loss of each composition was calculated. The loss of Comparative Example 1, 6, 11, 16 or 21 (standard composition) was assumed to be 100 and abrasion resistance was represented as an index by the following equation. The larger the index is the better the abrasion resistance.

Abrasion index=(loss of standard composition)/(loss of each composition)×100

(Wet Skid Test)

The maximum friction coefficient was measured according to the method of ASTM E303-83 using a portable skid tester made by The Stanley London Division of The Munro Group. The measured value of Comparative Example 1, 6, 11, 16 or 21 (standard composition) was assumed to be 100 and wet skid performance was represented as an index by the following equation. The larger the index is the better the wet grip performance.

Wet skid index=(value of each composition)/(value of standard composition)×100

The test results of the vulcanized rubber samples are shown in Tables 2 to 6.

TABLE 2

|  | Ex. | | Com. Ex. | | | | |
| --- | --- | --- | --- | --- | --- | --- | --- |
|  | 1 | 2 | 1 | 2 | 3 | 4 | 5 |
| Composition (parts by weight) | | | | | | | |
| SBR | 70 | 70 | 70 | 70 | 70 | 70 | 70 |
| NR | — | — | 30 | — | — | — | — |
| HANR | — | — | — | 30 | — | — | — |
| Polymer 1 | — | — | — | — | 30 | — | — |
| Polymer 2 | — | — | — | — | — | 30 | — |
| Polymer 3 | — | — | — | — | — | — | 30 |
| Polymer 4 | 30 | — | — | — | — | — | — |
| Polymer 5 | — | 30 | — | — | — | — | — |
| Silica | 50 | 50 | 50 | 50 | 50 | 50 | 50 |
| Silane coupling agent 1 | 5 | 5 | 5 | 5 | 5 | 5 | 5 |
| Antioxidant | 1 | 1 | 1 | 1 | 1 | 1 | 1 |
| Stearic acid | 2 | 2 | 2 | 2 | 2 | 2 | 2 |
| Zinc oxide | 3 | 3 | 3 | 3 | 3 | 3 | 3 |
| Sulfur | 1.5 | 1.5 | 1.5 | 1.5 | 1.5 | 1.5 | 1.5 |
| Vulcanization accelerator TBBS | 1 | 1 | 1 | 1 | 1 | 1 | 1 |
| Vulcanization accelerator DPG | 0.5 | 0.5 | 0.5 | 0.5 | 0.5 | 0.5 | 0.5 |
| Evaluation | | | | | | | |
| Processability | 103 | 104 | 100 | 103 | 105 | 102 | 101 |
| Rolling resistance | 103 | 105 | 100 | 101 | 102 | 101 | 101 |
| Abrasion resistance | 101 | 102 | 100 | 100 | 97 | 101 | 102 |
| Wet grip performance | 104 | 107 | 100 | 99 | 100 | 102 | 104 |

TABLE 3

|  | Ex. | | Com. Ex. | | | | |
| --- | --- | --- | --- | --- | --- | --- | --- |
|  | 3 | 4 | 6 | 7 | 8 | 9 | 10 |
| Composition (parts by weight) | | | | | | | |
| NR | — | — | 100 | — | — | — | — |
| HANR | — | — | — | 100 | — | — | — |
| Polymer 1 | — | — | — | — | 100 | — | — |
| Polymer 2 | — | — | — | — | — | 100 | — |
| Polymer 3 | — | — | — | — | — | — | 100 |
| Polymer 4 | 100 | — | — | — | — | — | — |
| Polymer 5 | — | 100 | — | — | — | — | — |
| Silica | 50 | 50 | 50 | 50 | 50 | 50 | 50 |
| Silane coupling agent 1 | 5 | 5 | 5 | 5 | 5 | 5 | 5 |
| Antioxidant | 1 | 1 | 1 | 1 | 1 | 1 | 1 |
| Stearic acid | 2 | 2 | 2 | 2 | 2 | 2 | 2 |
| Zinc oxide | 3 | 3 | 3 | 3 | 3 | 3 | 3 |
| Sulfur | 2 | 2 | 1.5 | 2 | 2 | 2 | 2 |
| Vulcanization accelerator TBBS | 1 | 1 | 1 | 1 | 1 | 1 | 1 |
| Vulcanization accelerator DPG | 0.5 | 0.5 | 0.5 | 0.5 | 0.5 | 0.5 | 0.5 |
| Evaluation | | | | | | | |
| Processability | 102 | 103 | 100 | 101 | 100 | 101 | 100 |
| Rolling resistance | 104 | 105 | 100 | 100 | 102 | 103 | 104 |
| Abrasion resistance | 101 | 102 | 100 | 99 | 96 | 101 | 100 |
| Wet grip performance | 107 | 109 | 100 | 99 | 101 | 103 | 104 |

TABLE 4

|  | Ex. | | Com. Ex. | | | | |
| --- | --- | --- | --- | --- | --- | --- | --- |
|  | 5 | 6 | 11 | 12 | 13 | 14 | 15 |
| Composition (parts by weight) | | | | | | | |
| SBR | 70 | 70 | 70 | 70 | 70 | 70 | 70 |
| NR | — | — | 30 | — | — | — | — |
| HANR | — | — | — | 30 | — | — | — |
| Polymer 1 | — | — | — | — | 30 | — | — |
| Polymer 2 | — | — | — | — | — | 30 | — |
| Polymer 3 | — | — | — | — | — | — | 30 |
| Polymer 4 | 30 | — | — | — | — | — | — |
| Polymer 5 | — | 30 | — | — | — | — | — |
| Silica | 50 | 50 | 50 | 50 | 50 | 50 | 50 |
| Silane coupling agent 2 | 5 | 5 | 5 | 5 | 5 | 5 | 5 |
| Antioxidant | 1 | 1 | 1 | 1 | 1 | 1 | 1 |
| Stearic acid | 2 | 2 | 2 | 2 | 2 | 2 | 2 |
| Zinc oxide | 3 | 3 | 3 | 3 | 3 | 3 | 3 |
| Sulfur | 1.5 | 1.5 | 1.5 | 1.5 | 1.5 | 1.5 | 1.5 |
| Vulcanization accelerator TBBS | 1 | 1 | 1 | 1 | 1 | 1 | 1 |
| Vulcanization accelerator DPG | 0.5 | 0.5 | 0.5 | 0.5 | 0.5 | 0.5 | 0.5 |
| Evaluation | | | | | | | |
| Processability | 103 | 104 | 100 | 103 | 105 | 102 | 101 |
| Rolling resistance | 104 | 106 | 100 | 101 | 102 | 102 | 102 |
| Abrasion resistance | 101 | 101 | 100 | 99 | 97 | 101 | 100 |
| Wet grip performance | 105 | 107 | 100 | 99 | 100 | 102 | 103 |

TABLE 5

| | Ex. | | Com. Ex. | | | | |
|---|---|---|---|---|---|---|---|
| | 7 | 8 | 16 | 17 | 18 | 19 | 20 |
| Composition (parts by weight) | | | | | | | |
| SBR | 70 | 70 | 70 | 70 | 70 | 70 | 70 |
| NR | — | — | 30 | — | — | — | — |
| HANR | — | — | — | 30 | — | — | — |
| Polymer 1 | — | — | — | — | 30 | — | — |
| Polymer 2 | — | — | — | — | — | 30 | — |
| Polymer 3 | — | — | — | — | — | — | 30 |
| Polymer 4 | 30 | — | — | — | — | — | — |
| Polymer 5 | — | 30 | — | — | — | — | — |
| Carbon black | 60 | 60 | 60 | 60 | 60 | 60 | 60 |
| Antioxidant | 1 | 1 | 1 | 1 | 1 | 1 | 1 |
| Stearic acid | 2 | 2 | 2 | 2 | 2 | 2 | 2 |
| Zinc oxide | 3 | 3 | 3 | 3 | 3 | 3 | 3 |
| Sulfur | 1.5 | 1.5 | 1.5 | 1.5 | 1.5 | 1.5 | 1.5 |
| Vulcanization accelerator TBBS | 1 | 1 | 1 | 1 | 1 | 1 | 1 |
| Evaluation | | | | | | | |
| Processability | 101 | 100 | 100 | 98 | 100 | 98 | 99 |
| Rolling resistance | 102 | 105 | 100 | 101 | 103 | 90 | 95 |
| Abrasion resistance | 103 | 101 | 100 | 101 | 98 | 102 | 100 |
| Wet grip performance | 103 | 106 | 100 | 99 | 101 | 102 | 104 |

TABLE 6

| | Ex. | | Com. Ex. | | | | |
|---|---|---|---|---|---|---|---|
| | 9 | 10 | 21 | 22 | 23 | 24 | 25 |
| Composition (parts by weight) | | | | | | | |
| NR | — | — | 100 | — | — | — | — |
| HANR | — | — | — | 100 | — | — | — |
| Polymer 1 | — | — | — | — | 100 | — | — |
| Polymer 2 | — | — | — | — | — | 100 | — |
| Polymer 3 | — | — | — | — | — | — | 100 |
| Polymer 4 | 100 | — | — | — | — | — | — |
| Polymer 5 | — | 100 | — | — | — | — | — |
| Carbon black | 60 | 60 | 60 | 60 | 60 | 60 | 60 |
| Antioxidant | 1 | 1 | 1 | 1 | 1 | 1 | 1 |
| Stearic acid | 2 | 2 | 2 | 2 | 2 | 2 | 2 |
| Zinc oxide | 3 | 3 | 3 | 3 | 3 | 3 | 3 |
| Sulfur | 2 | 2 | 1.5 | 2 | 2 | 2 | 2 |
| Vulcanization accelerator TBBS | 1 | 1 | 1 | 1 | 1 | 1 | 1 |
| Evaluation | | | | | | | |
| Processability | 101 | 102 | 100 | 101 | 103 | 95 | 97 |
| Rolling resistance | 103 | 106 | 100 | 101 | 102 | 92 | 95 |
| Abrasion resistance | 103 | 102 | 100 | 99 | 96 | 103 | 102 |
| Wet grip performance | 104 | 105 | 100 | 99 | 100 | 102 | 103 |

According to the present invention, both wet grip performance and low heat generating properties can be achieved while maintaining the excellent properties of epoxidized natural rubber such as mechanical properties and abrasion resistance.

What is claimed is:

1. A method of forming a modified, epoxidized natural rubber for use in a rubber composition as a tire tread which comprises:
    reacting an epoxidized natural rubber with a component selected from the group consisting of a Lewis acid, an amine compound, a thiol compound and an imidazole compound in a latex or a solution at a reaction temperature of 40° C. or more, to form a product consisting essentially of a modified, epoxidized natural rubber containing a ring-opened epoxy group wherein the modification degree of said modified epoxidized natural rubber is 5 to 60%.

2. The method of claim 1, wherein the protein content of said modified epoxidized natural rubber is at most 0.1% by weight converted to nitrogen content.

3. The method claim 1, wherein the epoxidization degree of said epoxidized natural rubber is 5 to 80% by mol.

4. The method of claim 1, wherein said Lewis acid is selected from the group consisting of an alcohol, a phenol compound, a carboxylic acid and an acid anhydride.

5. The method of claim 1, wherein the protein content of said modified epoxidized natural rubber is at most 0.05% by weight converted to nitrogen content.

6. The method of claim 1, wherein the reaction temperature of the reacting step is 40 to 65° C.

7. The method of claim 1, wherein the reaction time of the reacting step is at least 0.5 hour.

8. The method of claim 1, wherein the modified, epoxidized natural rubber is compounded with another rubber which is natural rubber, styrene butadiene rubber or high ammonia-type natural rubber.

9. A method of preparing a tire tread which comprises:
    reacting an epoxidized natural rubber with a component selected from the group consisting of a Lewis acid, an amine compound, a thiol compound, and an imidazole compound in a latex or a solution at a reaction temperature of 40° C. or more, to form a product consisting essentially of a modified, epoxidized natural rubber containing a ring-opened epoxy group wherein the modification degree of said modified epoxidized natural rubber is 5 to 60%,
    compounding 5 to 100% by weight product of said modified, epoxidized natural rubber with 0 to 95% by weight of another rubber, to form a rubber component, together with silica and/or carbon black to form said rubber composition, and
    forming the rubber composition into a tire tread.

10. The method of claim 9, wherein 5 to 150 parts by weight of a silica are compounded with 100 parts by weight of said rubber component, and the silica has a nitrogen-adsorbing specific surface area of 100 to 300 m$^2$/g.

11. The method of claim 9, wherein carbon black, having a nitrogen-adsorbing specific surface area of 70 to 300 m$^2$/g, is compounded with 100 parts by weight of said rubber component.

12. The method of claim 9, wherein a silane coupling agent is added in an amount of at most 20% by weight based on silica.

13. The method of claim 12, wherein said silane coupling agent is represented by the following formula (1)

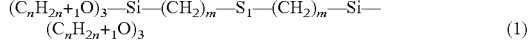

$(C_nH_{2n+1}O)_3$—Si—$(CH_2)_m$—$S_1$—$(CH_2)_m$—Si—$(C_nH_{2n+1}O)_3$     (1)

wherein n is an integer of 1 to 3, m is an integer of 1 to 4, l is the number of sulfur atoms in the polysulfide part and the average value of l is 2.1 to 4.5.

* * * * *